(12) United States Patent
Butler et al.

(10) Patent No.: US 6,720,968 B1
(45) Date of Patent: Apr. 13, 2004

(54) VIDEO ACQUISITION SYSTEM INCLUDING A VIRTUAL DUAL PORTED MEMORY WITH ADAPTIVE BANDWIDTH ALLOCATION

(75) Inventors: Cary Paul Butler, Austin, TX (US); B. Keith Odom, Georgetown, TX (US); Kevin L. Schultz, Georgetown, TX (US); Charles G. Schroeder, Round Rock, TX (US)

(73) Assignee: National Instruments Corporation, Austin, TX (US)

(*) Notice: Subject to any disclaimer, the term of this patent is extended or adjusted under 35 U.S.C. 154(b) by 0 days.

(21) Appl. No.: 09/210,636

(22) Filed: Dec. 11, 1998

(51) Int. Cl.$^7$ .............................................. G06F 13/18
(52) U.S. Cl. ...................... 345/535; 345/543; 345/538; 710/56; 711/158
(58) Field of Search ................................ 345/535, 557, 345/531, 532, 501, 547, 543, 536–538; 710/56; 711/1, 5, 100, 104–106, 154, 158; 348/441, 714–718, 465

(56) References Cited

U.S. PATENT DOCUMENTS

| | | | | |
|---|---|---|---|---|
| 4,872,054 A | * | 10/1989 | Gray et al. .................. 348/441 |
| 5,363,500 A | * | 11/1994 | Takeda ........................ 345/535 |
| 5,526,050 A | | 6/1996 | King et al. |
| 5,602,984 A | * | 2/1997 | Mieras ........................ 345/557 |
| 5,668,648 A | * | 9/1997 | Saito et al. ..................... 359/9 |
| 5,673,416 A | * | 9/1997 | Chee et al. .................. 345/535 |
| 5,706,482 A | * | 1/1998 | Matsushima et al. ........ 345/535 |
| 6,012,109 A | * | 1/2000 | Schultz ......................... 710/56 |
| 6,025,854 A | | 2/2000 | Hinz et al. |
| 6,124,889 A | | 9/2000 | Landowski |
| 6,161,154 A | | 12/2000 | Schultz et al. |
| 6,184,906 B1 | * | 2/2001 | Wang et al. ................. 345/532 |
| 6,366,325 B1 | * | 4/2002 | Wang .......................... 348/465 |
| 6,469,748 B1 | * | 10/2002 | Sato ............................ 348/714 |

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

A video capture system and method whereby video frames or images, which are received in one of a plurality of possible formats, are acquired and stored into on-board memory in an image format. The image data can then be transferred into system memory at an optimum rate. The video capture system comprises a host computer, including a video capture board, which is coupled to a video source, such as a video camera. The video source provides digital video data in a first format of a plurality of different possible formats. The video capture board includes a memory controller which receives the digital video data in the first format and selectively provides the digital video data to the buffer memory in an image format. The memory controller includes address generation logic for generating buffer memory addresses for storing the video data to the buffer memory in the image format. The address generation logic is programmable with configuration information corresponding to the first format and uses the configuration information to generate the addresses.

22 Claims, 5 Drawing Sheets

VIDEO ACQUISITION SYSTEM INCLUDING A VIRTUAL DUAL PORTED MEMORY WITH ADAPTIVE BANDWIDTH ALLOCATION

DESCRIPTION OF THE RELATED ART

The problem of acquiring video data into computer system memory (i.e. the main memory of a computer system) is increasingly the subject of attention in the field of image/video processing. As the performance of software image processing increases in response to improvements in CPU capacity, it is increasingly necessary to provide for fast and efficient acquisition of video frames from video source devices. Typical video sources include industrial cameras, camcorders, video cameras, VCRs, TV tuners, and laserdisk players.

Typically, a host computer system employs a video acquisition board to perform video frame acquisition. A video acquisition board is generally equipped with (a) an analog video port for coupling to an analog video source, (b) an A/D converter, (c) a frame acquisition buffer [RAM], (d) a bus connection to the host system, and (e) a DMA controller. In addition, a video board is often equipped with a digital video port for coupling to a digital video source.

An analog video source provides an analog video signal to the video board via the analog video port. The analog video signal is organized as a stream of video frames with a typical rate of 30 frames per second. The video board employs the A/D converter to digitize the analog video signal in response to synchronization information embedded in the analog video signal. The resulting digitized frame samples are temporarily stored in the frame acquisition buffer and then transferred to system memory.

A digital video source (e.g. a digital camera) provides a digital video signal to the video board via the digital video port. Since the digital video signal already comprises a stream of digitized video frames, the A/D converter (of the video board) is bypassed and frame data is stored directly into the frame acquisition buffer.

The frame acquisition buffer is generally large enough to prevent overrun of data as video data is received, stored, and transmitted to system memory. In some video acquisition boards, the frame acquisition buffer comprises only enough memory sufficient for buffering purposes, such as several Kilobytes. In other types of video acquisition boards, the frame acquisition buffer comprises enough storage for one or more digitized video frames. In these boards, the frame acquisition buffer is generally large enough to store several video frames in order to provide buffering of the bus connection to the host system.

The frame acquisition buffer is generally required to support video data writes by the video source to the buffer and reads of the video data performed by a DMA controller or CPU. One problem that arises is that the digital video image bandwidth varies. When the digital video image bandwidth increases, many times the frame acquisition buffer cannot support the increased bandwidth, and input video data is lost.

Current prior art imaging boards use dual port FIFOs or standard dual-ported memory architectures.

Therefore, an improved system and method is desired for allocating video buffer bandwidth in a video acquisition board. More particularly, an improved system and method is desired which enables the video acquisition board to receive video input data at varying rates, while also providing bandwidth for video data read operations.

SUMMARY OF THE INVENTION

The present invention comprises a video capture system and method which includes adaptive bandwidth allocation in a virtual dual ported frame buffer memory. The video capture system comprises a host computer coupled to a video source, such as a video camera. The host computer includes a CPU, a system memory, a peripheral bus, and a video capture board coupled to the peripheral bus of the computer which receives the video data from the video source. The video source produces a digital video signal which comprises pixel or image data for one or more video images or frames. In the preferred embodiment, the video source comprises a digital camera.

The video capture board comprises an input for receiving digital video data from a video source and a buffer memory coupled to the input which stores the digital video data. The buffer memory preferably comprises a virtual dual ported memory and is preferably a dynamic RAM memory, such as SDRAM. The video capture board also comprises a memory controller coupled to the input and to the buffer memory. The memory controller receives the digital video data from the video source and provides the digital video data to the buffer memory. The video capture board also includes a direct memory access (DMA) controller coupled to the buffer memory and operable to transfer the digital video data from the buffer memory to the computer memory.

In the preferred embodiment, the memory controller comprises a write control block for writing digital video data to the buffer memory, a read control block for reading digital video data from the buffer memory, and refresh logic which controls refresh cycles to the buffer memory. The memory controller further includes arbitration logic which receives requests from each of the write control logic, refresh logic, and the read control logic and grants buffer memory access to one of the write control logic, refresh logic, or the read control logic. The arbitration logic is operable to monitor requests from each of the write control logic, refresh logic, and the read control logic and dynamically allocate bandwidth to the write control logic, refresh logic and the read control logic based on the requests. In the preferred embodiment, write requests and refresh requests are considered high priority requests, and read requests are considered low priority requests.

In the preferred embodiment, the arbitration logic determines if any write requests, refresh requests or read requests are pending. The arbitration logic grants buffer memory access to the write control logic or the refresh logic if a write request or refresh request, respectively, is pending and a read request is not pending. The arbitration logic grants buffer memory access to the read control logic if a read request is pending and a write request or refresh request is not pending. If a high priority request, i.e., either a write or refresh request, and a read request are pending, the arbitration logic determines if the high priority request can be safely delayed. If the high priority request can be safely delayed, the arbitration logic grants buffer memory access to the read control logic. If the high priority request cannot be safely delayed, the arbitration logic grants buffer memory access to the high priority request.

BRIEF DESCRIPTION OF THE DRAWINGS

A better understanding of the present invention can be obtained when the following detailed description of the preferred embodiment is considered in conjunction with the following drawings, in which.

Figure 1:
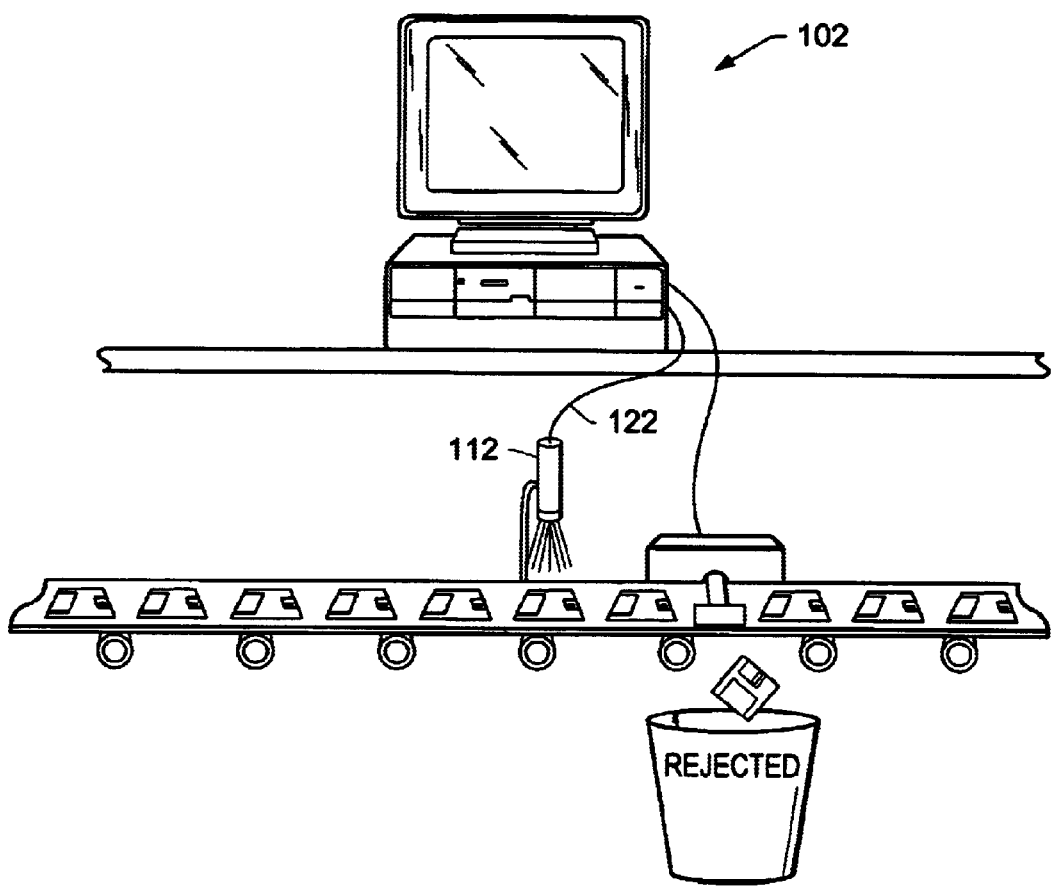
FIG. 1 illustrates a video capture system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1—Video Capture System

FIG. 1 illustrates a video capture system according to the preferred embodiment of the present invention. The video capture system comprises a host computer 102 and a video source 112. The video source 112 preferably produces a digital video signal which comprises a sequence of video frames, or other data desired to be acquired. The digital video signal is provided through a wire or cabling 122 to the host computer 102 for storage and/or processing.

The video source or camera 112 may be any of various types of cameras, including a single tap camera or a multi-tap camera, and further may have various orientations of shift registers. In the preferred embodiment, the video source 112 is a digital camera.

Figure 2:
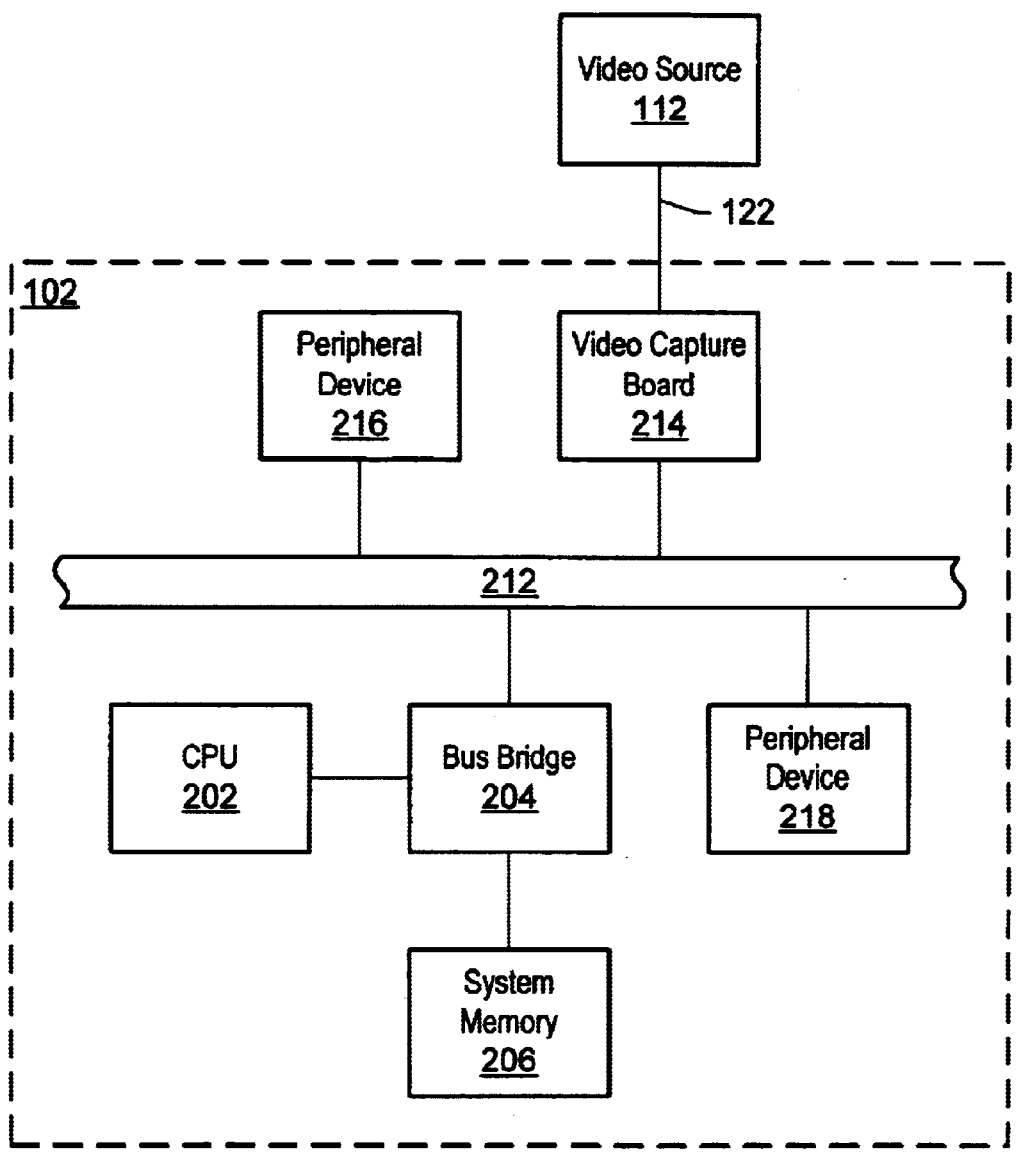
FIG. 2 is a high-level block diagram of the video capture system.

FIG. 2—Video Capture System Block Diagram

Referring now to FIG. 2, a high-level block diagram of the video capture system according to the present invention is presented. It is noted that the block diagram of FIG. 2 is exemplary only, and other computer system architectures may be used as desired.

The host computer 102 comprises a CPU 202, a Bus Bridge 204, system memory 206, and a peripheral bus 212. The CPU 202 is coupled to the Bus Bridge 204. The Bus Bridge 204 is coupled to the system memory 206 and the CPU 202, and couples to the peripheral bus 212. In the preferred embodiment, the peripheral bus 212 is the PCI expansion bus. However, it is noted that other types of buses may be used.

The host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the digital video signals to the video capture board 214. The video capture board 214 temporarily stores the digitized video frames in an on-board buffer until it can arrange for transfer to the system memory 206 through peripheral bus 212 and Bus Bridge 204.

According to the present invention, the video capture board 214 is operable to dynamically allocate bandwidth between writing the video data received from the video source 112 to the buffer 306 and transferring the video data from the buffer 306 to the computer system memory 206. The video capture board 214 also dynamically allocates bandwidth to refresh the DRAM video buffer.

Figure 3:
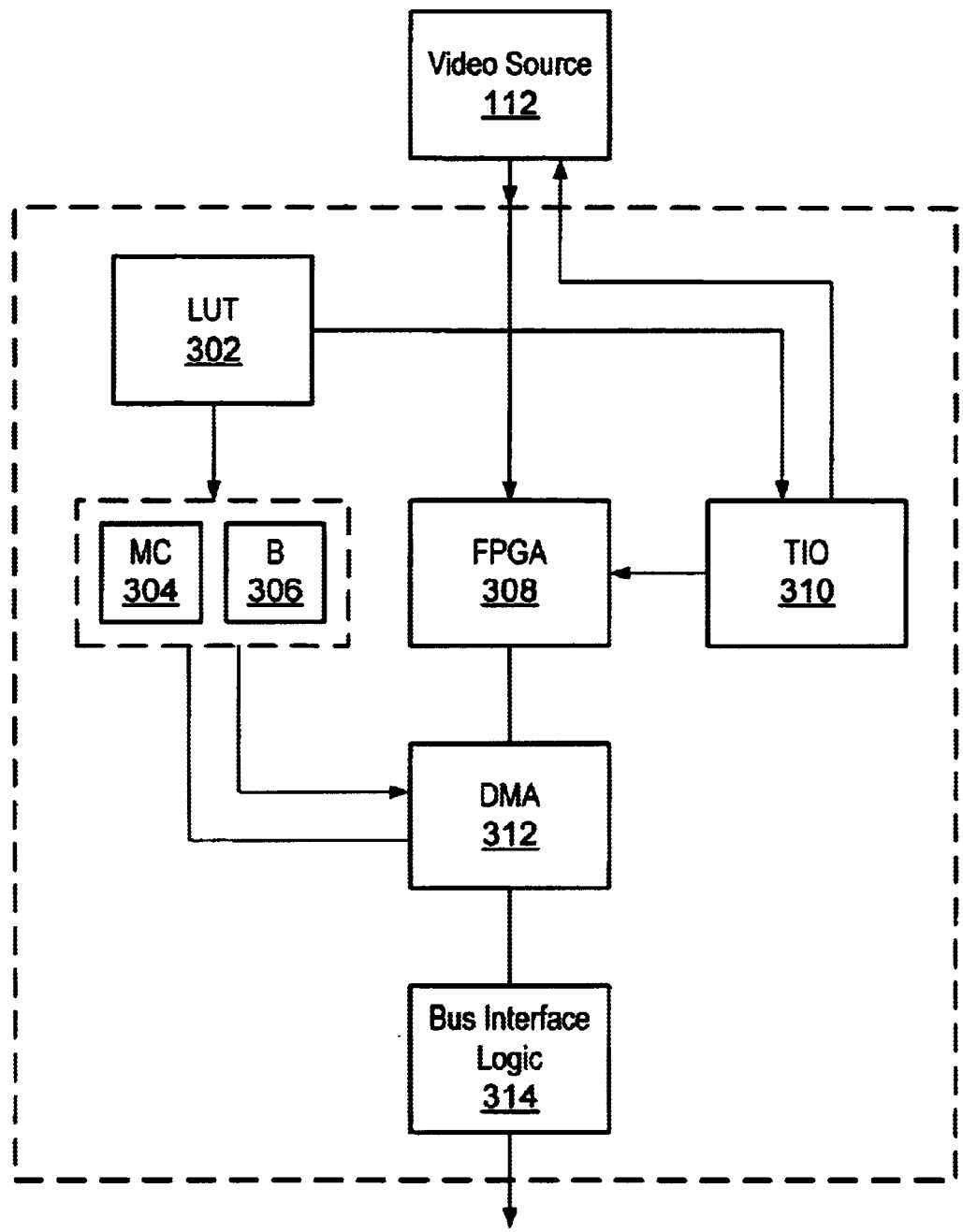
FIG. 3 is a block diagram of the video capture board according to the present invention.

FIG. 3—Video Capture Board

Referring now to FIG. 3, a more detailed block diagram of one embodiment of the video capture board 214 is shown. In the preferred embodiment, the video capture board 214 comprises a digital video port 300, a look-up table (LUT) 302, a memory controller 304 and associated frame acquisition buffer 306, a programmable logic element such as an FPGA 308, a timing I/O (TIO) device 310, a DMA controller 312, and peripheral bus interface logic 314.

The video source 112 (e.g. a digital video camera) produces a digital video signal. The digital video signal comprises pixel data for an image or frame. The video source 112 is coupled to digital video port 300, and provides the video capture board 214 with a digital video input signal or digital video data. The digital video input signal is provided through a look-up table (LUT) 302 to a memory system comprising memory controller 304 and buffer memory 306. The LUT 302 operates to map color pixel values to new values for desired processing functions.

Buffer memory 306 preferably comprises Synchronous Dynamic Random Access Memory (SDRAM). The memory controller 304 is coupled to buffer memory 306 via an address/data bus. The memory controller 304 includes logic according to the present invention which operates to configure the buffer 306 as a virtual dual ported FIFO. Also, according to the present invention, the memory controller 304 operates to arbitrate access to the buffer 306 between reads, writes, and memory refreshes.

The video source 112 is coupled to provide one or more control signals to control logic 308, which is preferably implemented in an FPGA. These control signals indicate the address of the received video data. The FPGA 308 receives the control signals and provides control information to the memory controller 304. The FPGA 308 uses the control signals to determine when the data will be valid at the memory controller 304, and the FPGA 308 provides a control signal or control information to the memory controller 304 when the video data is available to be latched.

Therefore, the video source 112 provides a control signals to the FPGA 308, and the FPGA 308 in turn provides control information to the memory controller 304. The memory controller 304 uses this information to determine whether the video source 112 is currently providing write data or image data to the video capture board 214. More particularly, when the FPGA 308 senses or detects valid data, the control FPGA asserts a write enable (WE) signal to the memory controller 304. When the memory controller 304 detects the WE signal asserted, the memory controller 304 begins latching data as long as the WE signal is held in the asserted state. When this data is latched into the memory controller 304, the memory controller 304 then writes the received video data into the SDRAM buffer 306. When the memory controller 304 writes video data into the memory buffer 306, the memory controller 304 indicates to the DMA controller 312 that data is available to be read, as discussed further below.

The video source 112 further provides control/timing signals to the timing I/O (TIO) chip 310. The TIO chip provides advanced timing information to the FPGA 308 to enable performance of operations such as scaling and region of interest.

The DMA controller 312 is coupled to the memory system, preferably to the memory controller 304. The DMA controller 312 is also coupled to the FPGA 308 and to the peripheral bus interface logic 314. The peripheral bus interface logic 314 is coupled to the peripheral bus 212. The DMA controller 312 is responsible for reading video data from the frame acquisition buffer 306 and transferring the video data to system memory 206.

Therefore, the video source 112 operates to provide video data to the memory controller 304, and the memory controller 304 writes the video data into the buffer 306. The DMA controller 312 operates to read video data from the memory system and provide the read video data to the system memory 206 of the computer system. Further, since the memory buffer 306 comprises synchronous dynamic random access memory (SDRAM), the memory controller 304 is required to generate refresh cycles to the dynamic RAM 306 to periodically refresh the memory 306.

Therefore, the memory controller 304 operates to arbitrate for three different types of accesses to the memory buffer 306, these being writes from the video source 112, reads from the DMA controller 312, and refresh cycles performed by the memory controller 304 itself. It is noted that the writes from the video source 112 and the refresh cycles performed by the memory controller 304 preferably receive priority. Refresh cycles must be performed on a timely basis to guarantee proper operation of the memory 306. Further, it is important that write data not be lost by the video source 112.

Figure 4:
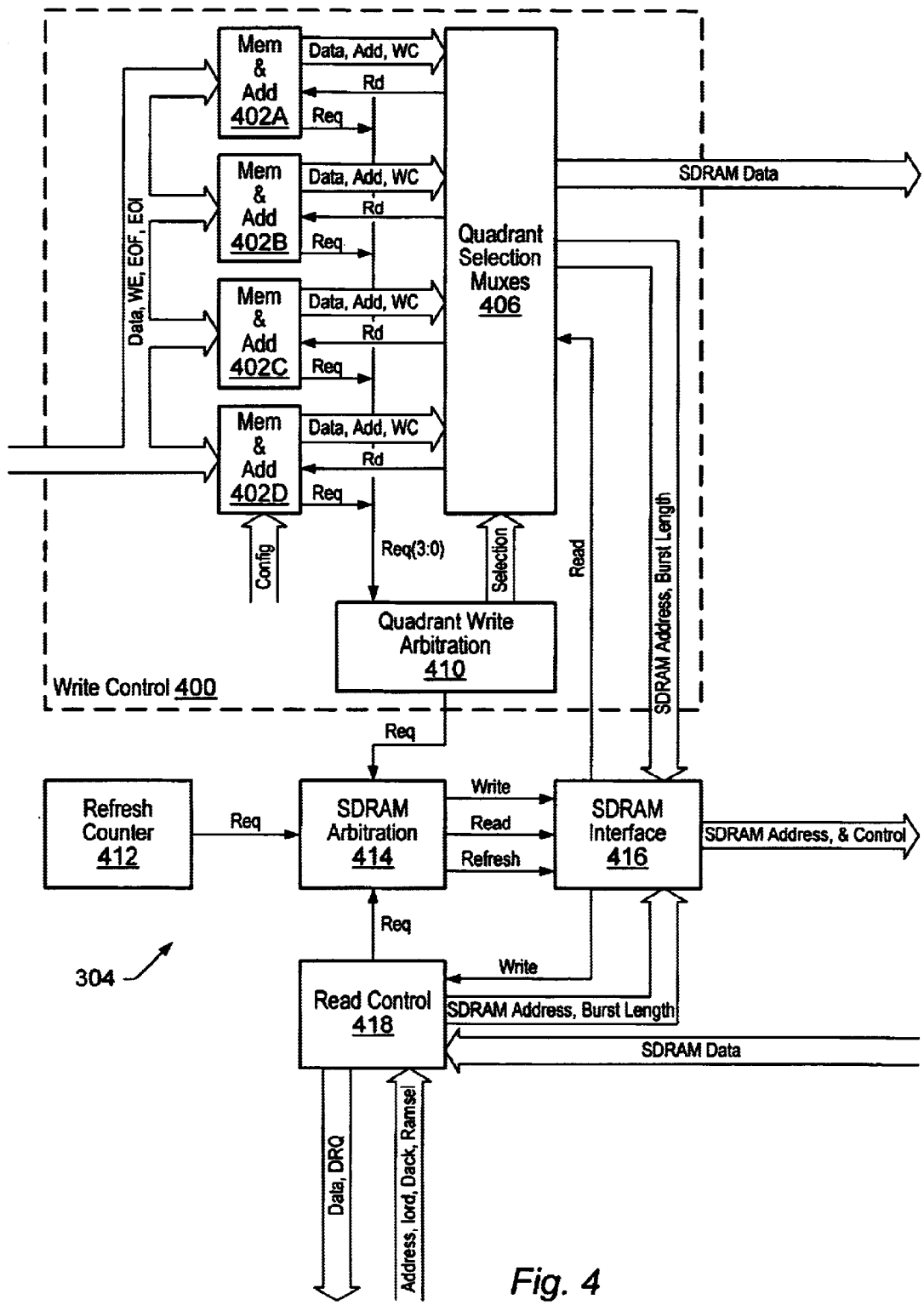
FIG. 4 is a block diagram of the memory controller comprised in the video capture board of the present invention.

FIG. 4—Memory Controller

FIG. 4 is a block diagram of the memory controller 304 comprised in the video capture board 214 of the present invention. As shown, the memory controller 304 includes a write control block 400, read control logic 418, refresh logic 412, SDRAM arbitration logic 414, and SDRAM interface logic 416.

The write control block 400 receives input data from the video source 112 and/or the lookup table 302. The write control block 400 receives the video data and also receives write enables, an end-of-field (EOF) signal and an end of image (EOI) signal. The write control block 400 preferably includes four input buffers 402A, 402B, 402C and 402D. Each of the input buffers 402A–402D further include address generation logic.

Each of the input buffers 402A–402D correspond to a respective tap of a single tap or multi-tap camera. As shown, each of the input buffers 402A–402D include address generation logic. Each of the input buffers/address generation logic 402A–402D receives configuration information, as shown, indicating the type of camera or video source 112. The address generation logic is programmed with the type of camera in order to enable the address generation logic to generate addresses in the proper sequence for storing of the video data in the SDRAM buffer 306 in the proper image format. In other words the digital video data is received from the video source 112 in a non-image format, such as a taps format. As the digital video data is received from the video source 112, the address generation logic operates to generate addresses, based on the configuration information, to store the data in the buffer 306 in an image format.

For more information on the memory buffer address generation performed by the memory controller 304 for storing image data in an image format, please see related co-pending application Ser. No. 09/205,573 titled "Video Acquisition System and Method Which Stores Video Data in an Image Format for Optimum Rate Transfer" whose inventors are Cary Paul Butler, Charles G. Schroeder, Kevin L. Schultz and B. Keith Odom, and which is hereby incorporated by reference in its entirety as though fully and completely set forth herein.

Each of the input buffers 402A–402D provide data, address, and write control signals to quadrant selection muxes 406. Each of the input buffers 402A–402D also generate write request signals which are provided to quadrant write arbitration logic 410. The quadrant write arbitration logic 410 receives the request signals from each of the active input buffers 402A–402D, grants one of the requests, and provides corresponding selection information to the quadrant selection muxes 406. It is noted that, in a single tap camera, only one input buffer generates a request signal, and thus no arbitration is required to be performed by the quadrant write arbitration 410. However, in a two tap or four tap camera, two requests or four requests, respectively, are generated to the quadrant write arbitration logic 410.

The quadrant write arbitration logic 410 receives the requests and grants the requests in a rotating fashion, preferably on a first come first served basis. The quadrant write arbitration logic 410 also provides selection information to the quadrant selection muxes 406 to configure the muxes to select the address and data from the proper quadrant or tap whose request has been granted. Thus the quadrant write arbitration logic 410 configures the muxes 406 to pass the data/address of the respective input buffer 402 whose request has been granted. Each of the input buffers 402A–402D that are active receive data at the same rate, and the quadrant write arbitration logic 410, which rotates through these requests, guarantees that each of the quadrants or taps receives the same amount of write bandwidth.

The quadrant selection muxes 406 thus operate to output digital video data to the SDRAM 306 corresponding to the selected input buffer/address generation logic 402 whose request has been granted. The quadrant selection muxes 406 also provide corresponding SDRAM address and burst length information to an SDRAM interface 416, wherein the SDRAM address and burst length information correspond to the digital video data output to the SDRAM 306. In addition, the quadrant write arbitration logic 410 provides a write request signal to SDRAM arbitration logic 414 according to the present invention.

The memory controller 304 further includes read control logic 418 which obtains SDRAM data from the memory buffer 306 during reads. When the write control block writes data into the memory buffer 306, the read control logic 418 generates a Data Request (DRQ) signal which is provided to the DMA controller 312. In the preferred embodiment, each time the memory controller 304 writes data into the SDRAM 306 for a respective tap, the memory controller 304 increases an address counter. The address counter value is used to indicate the address where the next piece of data will be written into the SDRAM buffer 306 for the respective tap. When the read control circuitry 418 in the memory controller 304 detects that the write address in the address counter is greater than where the read logic currently read last, i.e., detects that the write and read addresses are different, then the read control logic 418 knows that data has been written into the SDRAM. When the read logic 418 detects that the write and read addresses are different, then the read logic 418 asserts a data request (DRQ) signal to the DMA controller 312.

In response to the asserted DRQ signal, the DMA controller 312 asserts a Data Acknowledge (DACK) signal, an address, an iord control signal, and a RAM select (Ramsel) signal, indicating the desire to read data from the memory buffer 306 for output to the system memory 206. In the preferred embodiment, when the read logic 418 asserts the DRQ signal, the read logic 418 performs a pre-fetch on the address to fill internal FIFOs of the read control logic 418 with the associated video data. Thus, when the DMA controller 312 requests the data by generating the DACK signal and addresses, the memory controller 304 provides the data substantially immediately.

In response to the DMA request, the read control logic 418 provides SDRAM address and burst length information to the SDRAM interface 416, and the SDRAM interface 416 then outputs addresses to the SDRAM buffer 306 to read the data. The read data is received by the read control logic 418 from the SDRAM buffer 306 and provided to the DMA controller 312.

The memory controller 304 includes SDRAM arbitration logic 414 according to the present invention which arbitrates for access to the SDRAM interface 416 for performance of writes, reads, and memory refreshes. The SDRAM arbitration logic 414 receives a write request from the quadrant write arbitration logic 410. The SDRAM arbitration logic 414 also receives a request from refresh counter 412, which is requesting a refresh of the dynamic RAM. The SDRAM arbitration logic 414 further receives a request from the read control logic 418.

Therefore, the SDRAM arbitration logic 414 operates to receive request signals from each of the quadrant write arbitration logic 410, the refresh counter 412, and the read control logic 418. The SDRAM arbitration logic 414 grants a request to one of either the write, read or refresh operation and provides or asserts the corresponding write, read or refresh control signal to the SDRAM interface logic 416. Depending upon whether the write, read or refresh operation won the arbitration, the SDRAM interface 416 provides the corresponding SDRAM address and control information to the memory buffer 306 in order to write, read or refresh data, respectively, in the SDRAM buffer 306.

Thus, if the write control logic 400 is granted the arbitration by the SDRAM arbitration logic 414, the respective address generated by the address generation logic in the respective selected buffer 402 is provided through the quadrant selection muxes 406 to the SDRAM interface 416 and then to the buffer memory 306. In a similar manner, if the read control logic 418 is granted the arbitration by the SDRAM arbitration logic 414, then the DMA controller 312 is operable to read data from the buffer memory 306, i.e., the read control logic 418 receives the address from the DMA controller 312 and provides the address to the SDRAM interface 416 and then to the buffer memory 306 to retrieve the SDRAM data.

In the preferred embodiment of the invention, the memory controller 304 configures the memory buffer 306 as a dual ported memory. Thus, the video source 112 writes images into the memory buffer 306, and the DMA controller 312 reads images out of the memory buffer 306 to transfer to system memory 206 on the computer. The memory controller also controls access to the memory buffer 306, as desired.

It is desirable that the video source 112 never be halted, but rather the video source 112 be able to provide input digital video data uninterrupted to the video capture board 214. In addition, the SDRAM buffer 306 is a dynamic memory and thus requires refresh cycles for proper operation. The refresh cycles are generated by the memory controller 304 and are part of the arbitration performed by the SDRAM arbitration logic 414 as described above. Refresh cycles are similar to writes in that they cannot be ignored. According to the present invention, as the video source data input bandwidth increases, the SDRAM arbitration logic 414, which is in the memory controller 304, dynamically reduces the bandwidth of the DMA controller accesses to enable the video source 112 to write data into the memory buffer 306 unobstructed, and also to enable refreshes to occur at the appropriate times.

Figure 5:
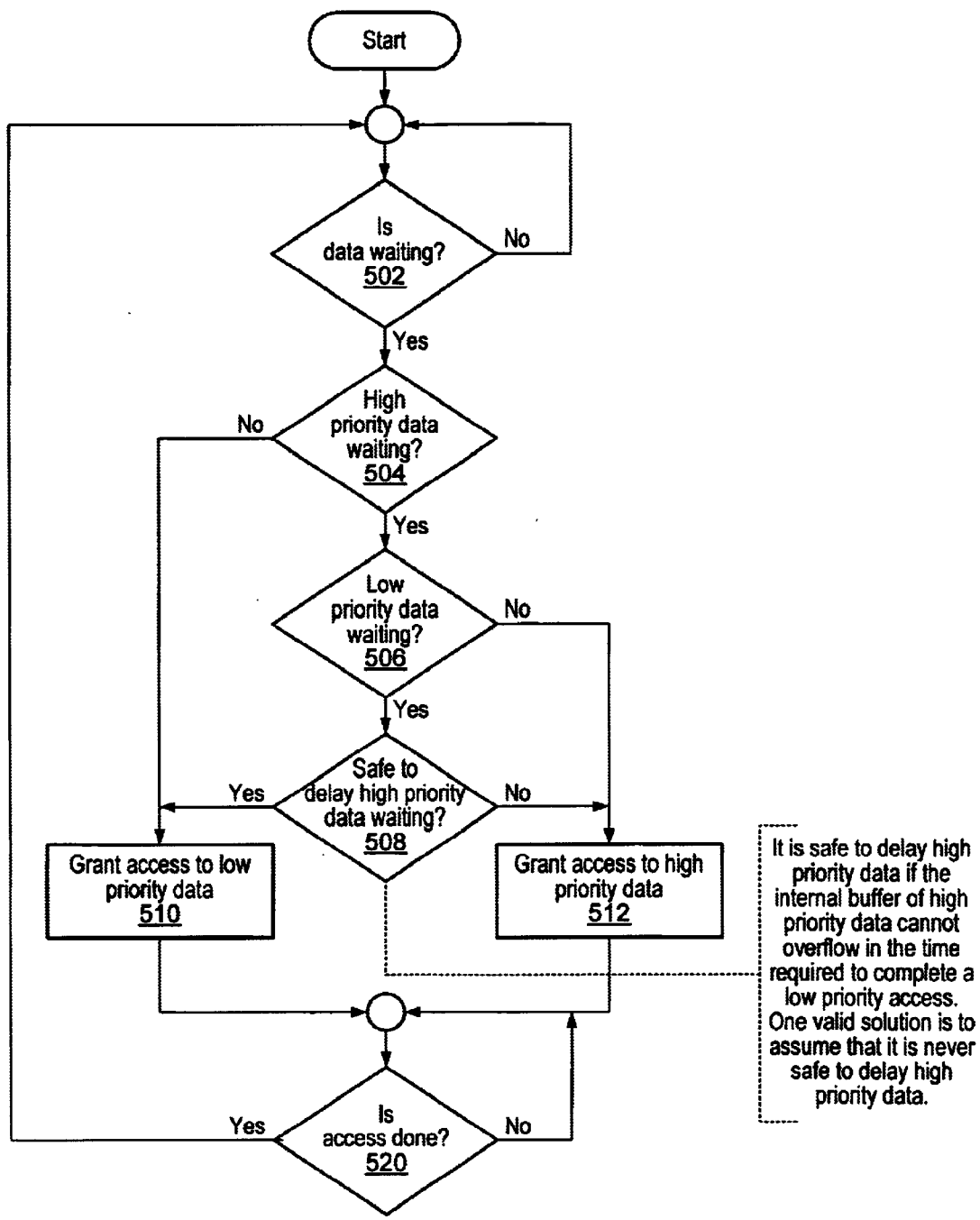
FIG. 5 is a flowchart diagram illustrating operation of the memory controller arbitration according to the present invention.

FIG. 5—Flowchart Diagram of SDRAM Arbitration Operation

FIG. 5 is a flowchart diagram illustrating operation of the SDRAM arbitration logic 414 according to the preferred embodiment of the invention. As shown, in step 502 the arbitration logic 414 determines if data is waiting, i.e., if an access is desired to the SDRAM buffer 306. More particularly, in step 502 the SDRAM arbitration logic 414 determines if a request is being made to the SDRAM buffer 306 for either a read, write, or refresh operation. In the preferred embodiment, as discussed above, write requests and memory refresh requests are referred to as high priority data requests, and a read request is a low priority data request.

In step 504 the SDRAM arbitration logic 414 determines if high priority data is waiting. In other words, in step 504 the arbitration logic 414 determines if a write request has been made to write data into the SDRAM buffer from the video source 112, or a refresh request has been made by the refresh logic 412 to perform a memory refresh on the SDRAM 306.

If a high priority request is not waiting as determined in step 504, then in step 510 the SDRAM arbitration logic 414 grants access to the low priority data request, i.e., the read request. After step 510, operation proceeds to step 520.

If a high priority data request is determined to be waiting in step 504, then in step 506 the SDRAM arbitration logic 414 determines if a low priority data request is waiting. If a low priority data request, i.e., a read request, is not waiting, i.e., a read request has not been generated as determined in step 506, then in step 512 the SDRAM arbitration logic 414 grants access to the high priority data request, i.e., to either the write or refresh request.

If a low priority data request, i.e., a read request, has been made as determined in step 506, then in step 508 the arbitration logic 414 determines if it is safe to delay the high priority data. In the preferred embodiment, it is safe to delay the high priority data, i.e., the write or refresh data, if the internal buffer comprising the high priority data cannot overflow in the time required to complete a low priority access. Thus, in step 508 the SDRAM arbitration logic 414 examines the internal buffer of the respective high priority data request and determines whether the internal buffer can overflow in the time required to complete a low priority request. If the internal buffer of the high priority data can overflow in the time required to complete the low priority access, then it is considered unsafe to delay the high priority data. However, if the internal buffer of the high priority data cannot overflow in the time required to complete the low priority access, e.g., the write buffer is not very full or is nearly empty, then in the preferred embodiment it is considered safe to delay the high priority data.

If the arbitration logic 414 determines that it is safe to delay the high priority data, in step 508, then operation proceeds to step 510, and the arbitration logic 414 grants access to the low priority data. If the arbitration logic 414 determines in step 508 that it is not safe to delay the high priority data request, the operation proceeds to step 512, and the arbitration logic 414 grants access to the high priority data request.

In one embodiment of the invention, it is assumed that it is never safe to delay high priority data. In this embodiment, steps 506 and 508 are omitted, and if high priority data is determined to be waiting in step 504, then operation proceeds directly from step 504 to step 512 to grant access to the high priority data request.

After either of steps 510 or 512, operation proceeds to step 520. In step 520 the arbitration logic 414 determines if the access is done or has completed. If not, then the arbitration logic 414 pulls or waits until the access is completed. Once the access is completed as determined in step 520, the operations returns to step 502 and the above operations repeat.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. An image acquisition device for acquiring one or more video images from a video source, the image acquisition device comprising:
   an input for receiving digital video data from a video source;
   a buffer memory coupled to said input which stores said digital video data; and
   a memory controller coupled to the input and to the buffer memory, wherein the memory controller comprises:
      write control logic which receives said digital video data from said video source and writes said digital video data to the buffer memory;
      read control logic which is operable to read said digital video data from the buffer memory; and
      arbitration logic coupled to the write control logic and the read control logic which receives requests from each of the write control logic and the read control logic and grants buffer memory access to one of the write control logic or the read control logic;
      wherein the arbitration logic is operable to monitor said requests from each of the write control logic and the read control logic and dynamically allocate bandwidth to the write control logic and the read control logic based on said requests;
      wherein, if both a write request and a read request are pending, the arbitration logic is operable to determine if the write request can be safely delayed;
      wherein the arbitration logic grants buffer memory access to the read control logic if both a write request and a read request are pending and the write request can be safely delayed;
      wherein the arbitration logic grants buffer memory access to the write control logic if both a write request and a read request are pending and the write request cannot be safely delayed.

2. The image acquisition device of claim 1, wherein the arbitration logic is operable to determine if a write request is pending, wherein the arbitration logic grants buffer memory access to the write control logic if the write request is pending.

3. The image acquisition device of claim 1, wherein the arbitration logic is operable to determine if a write request is pending, wherein the arbitration logic grants buffer memory access to pending read requests if a write request is not pending.

4. The image acquisition device of claim 1, wherein the arbitration logic is operable to determine if any write requests or read requests are pending, wherein the arbitration logic grants buffer memory access to the write control logic if a write request is pending and a read request is not pending.

5. The image acquisition device of claim 4, wherein the arbitration logic grants buffer memory access to the read control logic if a read request is pending and a write request is not pending.

6. The image acquisition device of claim 1, wherein the memory controller further comprises one or more input buffers for storing said digital video data from said video source prior to writing said digital video data to the buffer memory;
   wherein the arbitration logic is operable to determine if the write request can be safely delayed by examining said one or more input buffers and determining if said one or more input buffers cannot overflow in a time required to complete a read operation signified by the read request.

7. The image acquisition device of claim 1, wherein the memory buffer comprises a dynamic memory;
   wherein the memory controller further comprises refresh logic for generating memory refreshes to the dynamic memory, wherein the refresh logic is operable to generate refresh requests to the arbitration logic;
   wherein the arbitration logic is operable to monitor said requests from each of the write control logic, the read control logic and said refresh logic and dynamically allocate bandwidth to the write control logic, the read control logic, and the refresh logic based on said requests.

8. The image acquisition device of claim 1, further comprising:
   a direct memory access (DMA) controller coupled to said buffer memory and operable to transfer said digital video data stored in said buffer memory to a computer memory,
   wherein said DMA controller is operable to generate read requests to the read control logic, wherein said read control logic generates a request to the arbitration logic in response to a received read request from said DMA controller.

9. The image acquisition device of claim 8, further comprising:
   an address counter, wherein each time the memory controller writes the digital video data to the buffer memory, the memory controller increases the address counter;
   wherein the buffer memory includes a read address, wherein the read address is a location in the buffer memory where the read control logic last read the digital video data from the buffer memory;
   wherein the DMA controller is operable to generate the read requests to the read control logic in response to the read address being different than the address counter.

10. The image acquisition device of claim 1, wherein said image acquisition device is comprised in an image acquisition system, wherein said image acquisition system comprises:

a video source which provides said digital video data;

a computer system coupled to said video source which receives said digital video data, said computer system comprising:
  a CPU;
  system memory coupled to the CPU; and
  wherein said image acquisition device is comprised in said computer system and is coupled to the CPU and the system memory, wherein said image acquisition device comprises said input for receiving digital video data from said video source, said buffer memory, and said memory controller.

11. The image acquisition device of claim 1, wherein the write control logic includes one or more input buffers, wherein each of the one or more input buffers includes address generation logic.

12. The image acquisition device of claim 11, wherein each of the one or more input buffers corresponds to a respective tap of a camera.

13. The image acquisition device of claim 11, wherein the memory controller further comprises quadrant selection multiplexers, wherein the quadrant selection multiplexers are configured to select one of the one or more input buffers to pass video input data to the buffer memory.

14. A method for acquiring one or more video images from a video source, the method comprising:
  receiving digital video data from a video source;
  generating one or more write requests to write said digital video data in a buffer memory;
  generating one or more read requests to read digital video data from said buffer memory for transfer to a computer memory;
  receiving at least one of said write request and said read request;
  arbitrating among said at least one of said write request and said read request;
  granting buffer memory access to one of said write request or said read request in response to said arbitrating;
  performing a write operation to write said digital video data to the buffer memory in response to granting buffer memory access to said write request;
  performing a read operation to read digital video data from the buffer memory in response to granting buffer memory access to said read request;
  wherein said arbitrating monitors said write requests and said read requests and operates to dynamically allocate bandwidth to said write operations and said read operations based on said requests;
  wherein, if both a write request and a read request are pending, said arbitrating determines if the write request can be safely delayed;
  wherein said arbitrating selects said read request for granting of buffer memory access if both a write request and a read request are pending and the write request can be safely delayed;
  wherein said arbitrating selects said write request for granting of buffer memory access if both a write request and a read request are pending and the write request cannot be safely delayed.

15. The method of claim 14, wherein said arbitrating determines if a write request is pending, wherein said arbitrating selects said write request for granting of buffer memory access if said arbitrating determines that a write request is pending.

16. The method of claim 14, wherein said arbitrating determines if a write request is pending, wherein said arbitrating selects a pending read request for granting of buffer memory access if said arbitrating determines that a write request is not pending.

17. The method of claim 14, wherein said arbitrating determines if any write requests or read requests are pending, wherein said arbitrating selects said write request for granting of buffer memory access if a write request is pending and a read request is not pending.

18. The method of claim 17, wherein said arbitrating selects said read request for granting of buffer memory access if a read request is pending and a write request is not pending.

19. The method of claim 14,
  wherein said receiving digital video data from the video source includes storing said digital video data from said video source in one or more input buffers prior to writing said digital video data to the buffer memory;
  wherein said arbitrating determines if the write request can be safely delayed by examining said one or more input buffers and determining if said one or more input buffers cannot overflow in a time required to complete a read operation signified by the read request.

20. The method of claim 14, wherein the memory buffer comprises a dynamic memory; the method further comprising:
  generating a refresh request for memory refreshes to the dynamic memory;
  wherein said arbitrating monitors said write requests, said read requests and said refresh requests and dynamically allocates bandwidth to said write operations, said read operations and refresh operations based on said requests.

21. The method of claim 14, further comprising:
  transferring digital video data stored in said buffer memory to a computer memory in response to granting buffer memory access to said read request.

22. A method for acquiring one or more video images from a video source, the method comprising:
  receiving digital video data from a video source;
  generating one or more write requests to write said digital video data in a buffer memory;
  generating one or more read requests to read digital video data from said buffer memory for transfer to a computer memory;
  receiving at least one of said write request and said read request;
  granting buffer memory access to one of said write request or said read request;
  performing a write operation to write said digital video data to the buffer memory in response to granting buffer memory access to said write request;
  performing a read operation to read digital video data from the buffer memory in response to granting buffer memory access to said read request;
  wherein said granting is selectively performed to dynamically allocate bandwidth to said write operations and said read operations based on said requests;
  wherein, if both a write request and a read request are pending and the write request can be safely delayed, said granting selects said read request;
  wherein, if both a write request and a read request are pending and the write request cannot be safely delayed, said granting selects said write request.

* * * * *